United States Patent
Florea

(10) Patent No.: US 6,553,234 B1
(45) Date of Patent: Apr. 22, 2003

(54) METHOD OF FREQUENCY REUSE IN A FIXED ACCESS WIRELESS NETWORK

(75) Inventor: Adrian Florea, Ottawa (CA)

(73) Assignee: Alcatel Canada, Inc., Kanata (CA)

( * ) Notice: Subject to any disclaimer, the term of this patent is extended or adjusted under 35 U.S.C. 154(b) by 0 days.

(21) Appl. No.: 09/561,867

(22) Filed: May 1, 2000

(51) Int. Cl.$^7$ .............................................. H04Q 7/00
(52) U.S. Cl. ...................................... 455/452; 455/63
(58) Field of Search .................................. 455/436, 437, 455/438, 439, 440, 442.447, 450.62, 452.63; 370/321, 322, 350

(56) References Cited

U.S. PATENT DOCUMENTS

| | | | |
|---|---|---|---|
| 5,111,534 A | 5/1992 | Benner | |
| 5,247,699 A | 9/1993 | Hartman | |
| 5,483,667 A | 1/1996 | Faruque | ........................ 455/450 |
| 5,734,983 A | 3/1998 | Faruque | ........................ 455/450 |

*Primary Examiner*—Thanh Cong Le
(74) *Attorney, Agent, or Firm*—Pennie & Edmonds LLP

(57) ABSTRACT

Fixed access wireless networks generally includes a grouping of cells, with each cell comprising a base transceiver station in radio frequency contact with a plurality of terminal stations. Such networks are typically assigned a limited number of frequencies to facilitate data transfer. Various techniques are used to maximize the amount of data which can be transferred including polarization, modulation and frequency reuse. A Local Multi-point Distribution System (LMDS) is a form of fixed wireless network, a notable feature of which are the directional nature of their terminal station antennae. The present invention provides a method of assigning frequencies to an LMDS, by exploiting the directivity of the fixed terminal station antennae. Each cell is divided into an even number of at least four sectors. Given a desired carrier to interference ratio, the cells are grouped into clusters, the cluster size defining the interference boundary for a given cell in the cluster. Within each cell sector, interference zones arising from interfering signals from one or more distant base transceiver stations within the cluster are eliminated by controlling the frequency reuse assignments to the interfering base transceiver stations and the interference zones within the sector. A higher frequency reuse factor results and serves to increase the overall traffic capacity in the LMDS.

30 Claims, 9 Drawing Sheets

FIGURE 2 - C/(N + I) Plot

METHOD OF FREQUENCY REUSE IN A FIXED ACCESS WIRELESS NETWORK

BACKGROUND OF THE INVENTION

1. Field of the Invention

The present invention relates to fixed wireless communication networks and more particularly to a method of frequency reuse in such a communications network.

2. Description of the Related Art

As depicted in FIG. 1, a Local Multi-point Distribution System (LMDS) 8 is a fixed access wireless system comprised of a collection of base transceiver stations (BTS) 10 which broadcast and receive signals from a large number of terminal radio stations (TS) 12. The terminal stations are fixed and equipped with directional antennas (not shown), each of which are oriented toward a serving BTS. The base transceiver stations 10 can accommodate omni-directional transmission in which case they are equipped with omni-directional antennas, or they can be sectorized in which case they are equipped with directional sector antennas. A specified base transceiver station 10 and its associated terminal radio stations 12 comprise a "cell" 14 the basic building block in a wireless network. The cells 14 are theoretically considered to be circular in shape. The base transceiver stations 10 are each connected to a backbone network 16, which may be a computer network, a cable television network, a public telephone network or the like. Connection to backbone network 16 may be accomplished using copper wire, fibre optics, wireless transmission or a combination of these communication means.

An LMDS 8 typically operates in the frequency range of 24.0 GHz to 42.0 GHz. In general, LMDS system architectures generally differ in terms of cell size, modulation format and BTS antenna type. Other system design parameters include antenna patterns, antenna heights, antenna pointing, cell spacing, frequency reuse plan, polarization reuse plan and link budget. For example, a two-way multiple access LMDS system described by Texas Instruments (TI) to the FCC Negotiated Rulemaking Committee (NRMC) on the LMDS/FSS 28 GHz band, July–September 1994, utilizes 52 Mbps Quadrature Phase Shift Keying (QPSK) and four directional sector antennas at each BTS to provide omni-directional cell coverage with a nominal cell radius of 5 km. Typically multiple TSs within a cell are serviced by their associated BTS in accordance with time and frequency division multiplexing techniques. In operation, a given BTS broadcasts on a number of assigned frequencies with each TS antenna programmed to receive on one designated frequency.

A broadband fixed wireless network as described above provides the physical infrastructure to provide wireless access to services ranging from one-way video distribution and telephony to fully-interactive switched broadband multimedia applications. Various techniques are employed to maximize the amount of traffic which can be carried in the network. As noted above, efficient modulation schemes from QPSK to Quadrature Amplitude Modulation (e.g. 64 QAM) are used to increase the frequency efficiency of the system. Additionally, due to the limited frequency range available for operation of an LMDS, frequency reuse is employed for re-assigning available frequencies between cells in a fixed wireless network. Typically, a network manager utilizing a programmed general purpose computer would determine the manner in which frequencies will be allotted between the cells 14 in an LMDS 8.

Frequency reuse is a method of optimizing spectrum usage, enhancing channel capacity, and reducing interference. It will be appreciated by those in the art, interference can also be reduced using other techniques such as space separation of transmitting equipment, time separation of broadcasts and signal polarization. Frequency reuse involves channel numbering, channel grouping into subsets, and assigning particular channels to particular cells. A plurality of cells are then associated together into clusters and utilize all of the assigned frequency channels in a prescribed manner. Groups of clusters are then used to provide coverage over a defined geographic area and the frequency channels allocated to one cluster are reused in other clusters. The scheme for recycling or reassigning the frequency channels throughout the coverage area is referred to as a reuse plan. The distance between a first cell within a cluster using a particular frequency channel and a second cell using the same frequency channel is further known as a reuse distance. The principal objective of such a reuse scheme is to ensure adequate channel isolation to reduce channel interference while maintaining a high channel capacity.

It will be understood by those skilled in the art that the term decibel which will be used throughout the description, is a common unit used in relation to radio frequency transmission to denote relative differences in signal strength and is expressed as the base 10 logarithm of the ratio of the powers of two signals i.e. dB=10 log (P1/P2). Logarithms are useful as the unit if measure because signal power tends to span several orders of magnitude.

As explained above, the reuse of the same frequency channels by a number of different cells implies that cells may suffer from co-channel interferences. Depending on the operating frequency band, the terminal station directional antenna can have a high gain in the range of 25 to 45 dbi. Therefore, the directional antenna will reject most of the interfering radio signals from nearby BTSs, except those signals arriving at the TS from distant BTSs lying in the same direction as the BTS serving the TS. It is generally desirable for the received strength of the serving carrier (C) within each cell to be higher than the total co-channel interference level (I). As a result, the higher the carrier to interference (C/I) ratio, the better the data transmission quality. A higher C/I value is obtained partly by controlling the channel reuse distance. The larger the reuse distance between adjacent cells utilizing the same frequency channels, the lesser the co-channel interferences created between those cells. Since the C/I ratio is normally dictated by, among other things, the equipment used in the wireless network (i.e. its ability to discriminate a useful signal), in order to maximize frequency reuse, the minimum acceptable reuse distance is identified for a stated C/I and the available frequencies are distributed between cells accordingly. A number of other physical factors can also affect C/I in wireless networks e.g. buildings, geography, antenna radiation patterns, and transmitting power.

It will also be appreciated by those in the art that there is a trade-off between modulation schemes and frequency reuse plans. The higher and more efficient the modulation scheme, the higher the minimum required carrier to interference (C/I) level, which forces a reduced frequency reuse factor (the ratio between the amount of bandwidth used at each cell and the total frequency bandwidth available). For example, if 16 QAM is used instead of QPSK, the frequency planner would have to consider BTSs which are further away since a higher C/I ratio is required to meet the QAM specification (i.e. in theory 4 bits/s/Hz). The C/I ratio is related to the frequency reuse plan (N/F) where N indicates the number of cells included within a single cluster and F indicates the number of frequency groups. For example, the C/I ratio is directly related to the following equation:

$$D_R = (3 \times F)^{1/2} \times R$$

where: $D_R$ is the reuse distance; F is the number of frequency groups; R is the radius of a cell.

Accordingly, the larger the F value, the greater the reuse distance. However, it is not always possible to use a larger F value to increase the C/I ratio. Since the total number of available frequency channels (T) is generally fixed within a wireless network, if there are F groups, then each group will contain T/F channels. As a result, a higher number of frequency groups (F) would result in fewer channels per cell and lesser transmission capacity.

In a mobile cellular radio system, capacity is not a major issue when the system initially goes into operation. Therefore, in order to achieve a high C/I value, a high frequency reuse plan (N/F), such as 9/27, is initially used. However, as the capacity increases, the mobile cellular radio system has to resort to a lower frequency reuse plan, such as a 7/21 or 4/12, to allocate more frequency channels per cell.

A prior art method of symmetrical frequency reuse in a mobile cellular radio system begins with two integers, i and j, that are referred to as shift parameters. The frequency plan is established by starting with a reference cell and moving over i cells along the chain of cells. After reaching the $i^{th}$ cell, a counter-clockwise turn of 60° is made and another move of j cells is made. The $j^{th}$ cell can safely be a co-channel cell. The frequency plan can also be established by moving j cells before turning i cells or by turning 60° clockwise.

After all the possible co-channel cells of the initial cell are laid out, another reference cell is chosen and the procedure is repeated. This entire procedure is repeated as often as necessary to establish the frequency reuse plan over the entire wireless network.

The cells thus established by the above procedure form a reuse pattern of $i^2+ij+j^2$ cells. The number of cells in this reuse pattern is a predominant concern of the cellular industry since this number determines how many different channel groups can be formed out of the frequency spectrum allocated to the network. A low number of cells in a reuse pattern means more channel groups can be formed and more users accommodated.

Although the above frequency reuse scheme works adequately, it is not appropriate for a Local Multi-point Distribution System (LMDS). The frequency reuse schemes developed for mobile cellular networks have been created for radio access systems where subscriber terminal radio stations are equipped with non-directive antennas. In fixed access wireless networks like an LMDS, the terminal radio stations are equipped with highly directive antenna, which reject most of the intra-system interfering signals coming from other than the serving base station i.e. there is generally less interference arising which offers different possibilities from a frequency reuse perspective. Frequency reuse schemes need to be developed which exploit the directivity of the terminal station antennas.

SUMMARY OF THE INVENTION

The present invention serves to overcome the deficiencies of the prior art by providing a method of assigning frequencies to a fixed wireless network, specifically an LMDS. By exploiting the directivity of the fixed terminal stations, the method serves to increase overall traffic capacity in an LMDS where a specified number of frequencies have been assigned. In a wireless network comprising i×j cells, each cell is divided into an even number of at least four sectors. Within each sector there exist interference zones, the number and magnitude of which are a function of the number and location of cells in the network and the minimum required C/I in the network. Given a desired carrier to interference ratio, the cells are grouped into clusters, the cluster size defining the interference boundary for a given cell in the cluster. A high frequency reuse factor is achieved by controlling the frequency reuse assignments to interference zones within each sector of the cells within a cluster.

In one aspect of the invention there is provided in a fixed wireless network utilizing an assigned group of frequency channels and comprising i×j cells, wherein each of the cells is divided into an even number of at least four sectors, and wherein each of the cells includes a base station and a plurality of terminal stations, a method of frequency reuse comprising the steps of: receiving input data including: (i) a desired carrier to interference ratio; (ii) the number of cells in the network; and (iii) the number of frequency channels available; calculating a reuse distance based on the desired carrier to interference ratio; calculating a cluster size based on the calculated reuse distance; determining the position and number of interference zones within each of the sectors, wherein the interference zones are a function of the cluster size; assigning frequency channels to the interference zones; determining which of the allotted frequency channels cannot be used within a specified one of the cells; determining which of the allotted frequency channels cannot be used within a specified one of the sectors; and assigning any remaining ones of the allotted frequency channels to one or more neutral zones extending between the interference zones.

In another aspect of the present invention, there is provided a system for facilitating data transfer comprising: a backbone network; a fixed wireless network utilizing an assigned group of frequency channels and comprising i×j cells, wherein each of the cells is divided into an even number of at least four sectors, and wherein each of the cells includes a base station in radio frequency contact with a plurality of terminal stations located in the cell, the base station also communicating with the backbone network; and means for maximizing the data traffic which can be processed through the fixed wireless network, wherein said maximizing means carries out at least a method of frequency reuse comprising the steps of: receiving input data including: (i) a desired carrier to interference ratio; (ii) the number of cells in the network; and (iii) the number of frequency channels available; calculating a reuse distance based on the desired carrier to interference ratio; calculating a cluster size based on the calculated reuse distance; determining the position and number of interference zones within each of the sectors, wherein the interference zones are a function of the cluster size; assigning frequency channels to the interference zones; determining which of the allotted frequency channels cannot be used within a specified one of the cells; determining which of the allotted frequency channels cannot be used within a specified one of the sectors; and assigning any remaining ones of the allotted frequency channels to one or more neutral zones extending between the interference zones.

In yet another aspect of the present invention, there is provided a computer readable medium having stored thereon, computer-executable instructions which, when executed by a processor, cause the processor to perform the steps of: receiving input data including: (i) a desired carrier to interference ratio; (ii) the number of cells i×j in a fixed wireless network; and (iii) the number of frequency channels assigned to the network, wherein each of the cells includes a base station in radio frequency contact with a plurality of terminal stations located in the cell; calculating a reuse distance based on the desired carrier to interference ratio; calculating a cluster size based on the calculated reuse distance; determining the position and number of interference zones within each sector of the cells, wherein the interference zones are a function of the cluster size, and wherein each of the cells is divided into an even number of at least four sectors; assigning frequency channels to the interference zones; determining which of the allotted frequency channels cannot be used within a specified one of the cells; determining which of the allotted frequency channels cannot be used within a specified one of said sectors; and assigning any remaining ones of the allotted frequency channels to one or more neutral zones extending between the interference zones.

BRIEF DESCRIPTION OF THE DRAWINGS

A better understanding of the invention will be obtained by reading the description of the invention below, with reference to the following drawings, in which.

DESCRIPTION OF THE PREFERRED EMBODIMENT

General

The preferred embodiment of the present invention is implemented as a software module which may be executed in a conventional manner on a variety of hardware platforms. The software is stored in the memory and subsequently loaded into and executed by the processor integral to the hardware platform. Once initiated, the software of the preferred embodiment operates in the manner which will be described below.

As will be appreciated by those skilled in the art, the expression "hardware platform" is used to describe the main physical components of a general purpose computer. In general, such a device comprises a bus for communicating instructions, a processor coupled to the bus for processing the instructions, random access memory coupled to the bus for storing volatile information and instructions for the processor, read only memory coupled to the bus for storing static information and instructions for the processor, a display device coupled to the bus for displaying information to a user, an alphanumeric input device coupled to the bus for communicating information and command selections to the processor, and a mass storage device (hard disk, floppy disk, etc.) for storing information and instructions.

Figure 1:
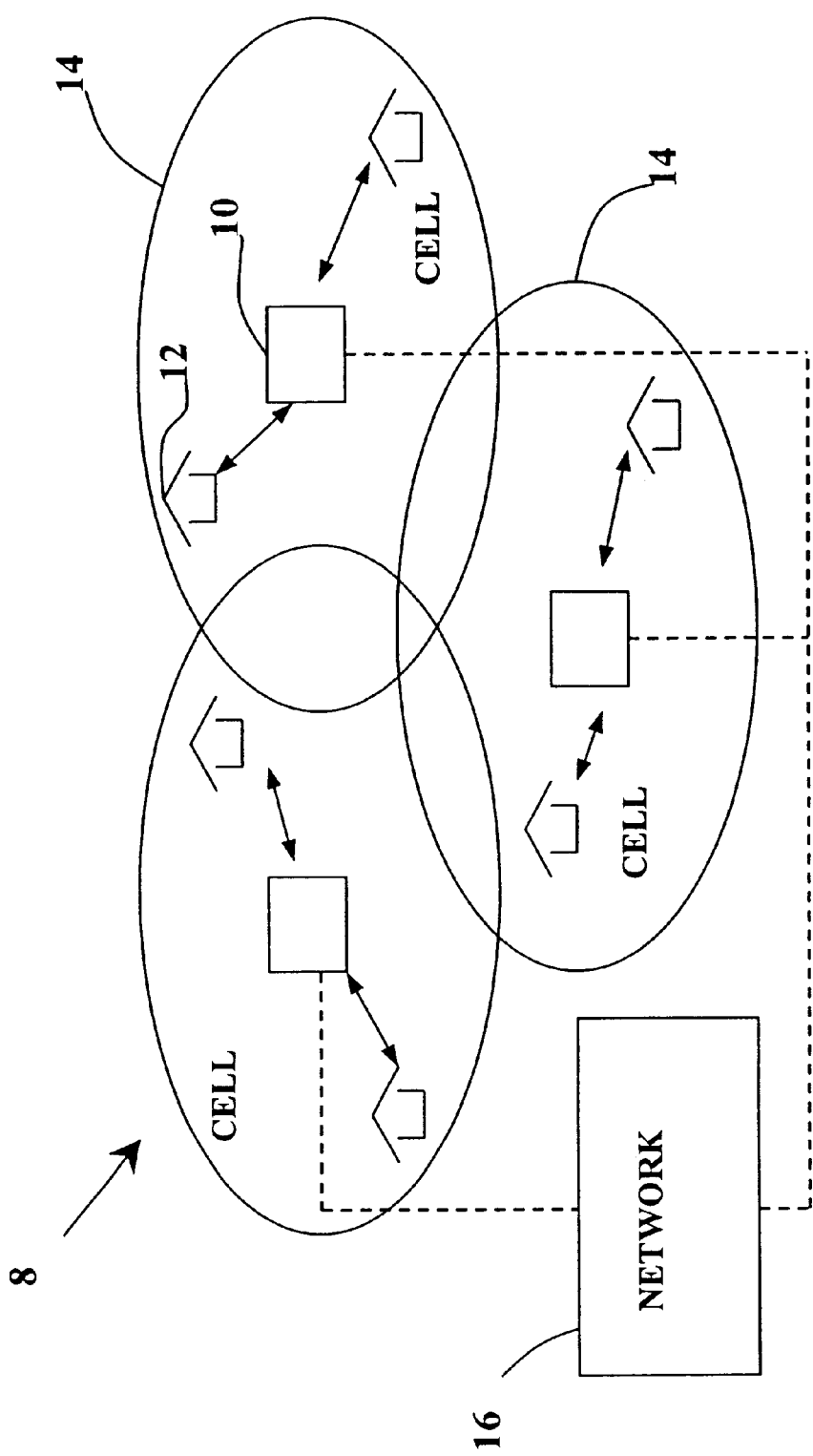
FIG. 1 depicts a typical multi-cell LMDS.
Figure 2:
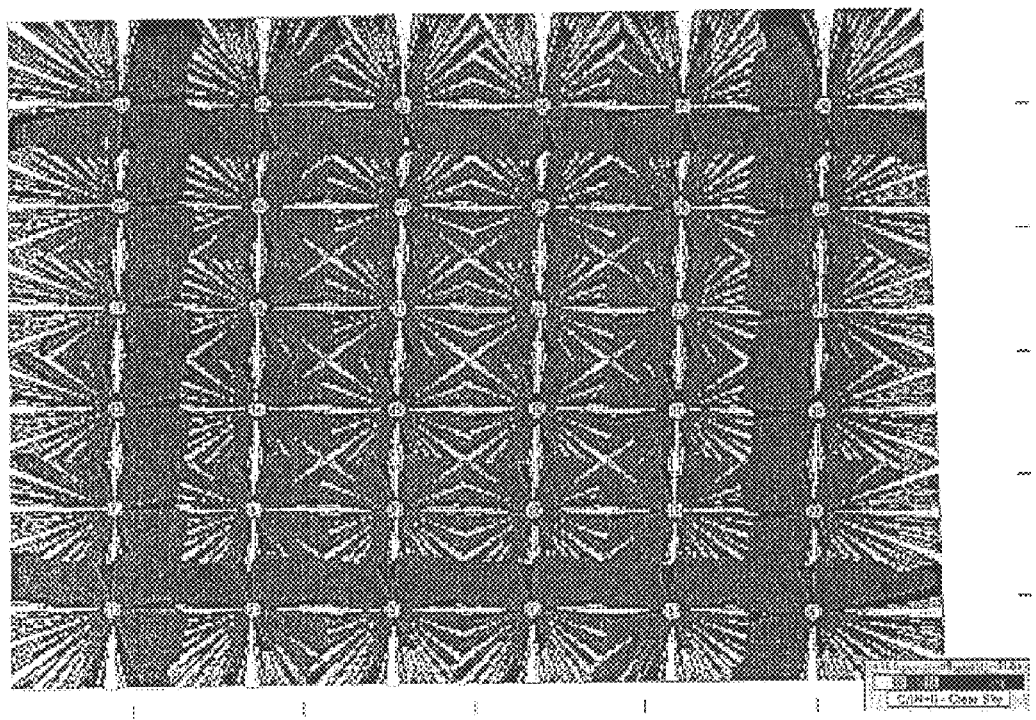
FIG. 2 depicts the interference pattern in a multi-cell LMDS when a single frequency is used by all base stations.

FIG. 2 depicts, using computer simulation, the interference pattern which arises when a single frequency is used in a typical LMDS. It can be seen that the C/I level is lowest in the areas where the TS antennas receive interfering signals from BTSs, which are co-linear with the TS and serving BTS.

Figure 3:
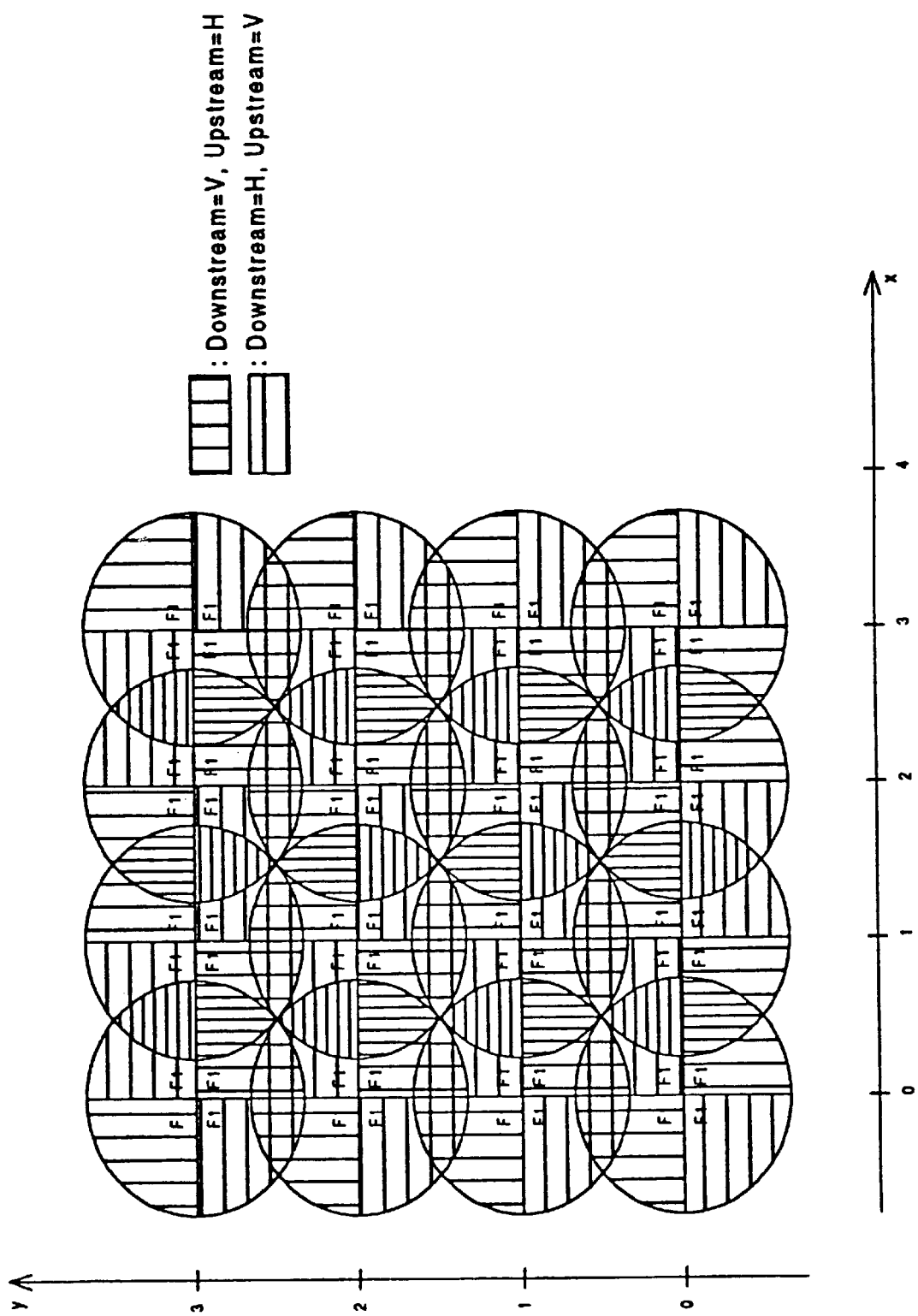
FIG. 3 depicts a multi-cell LMDS using a four sector cell configuration with alternating polarization.
Figure 4:
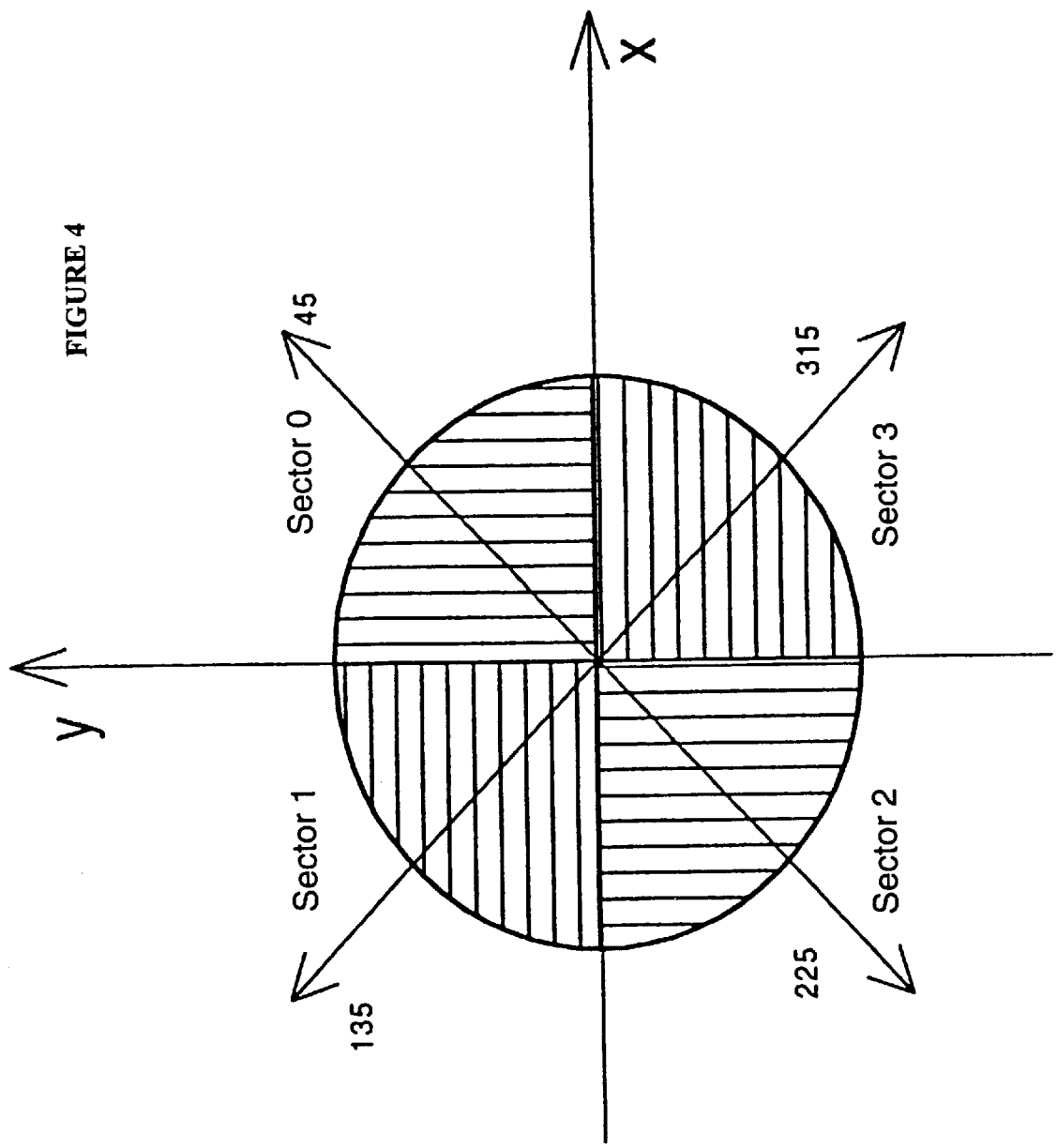
FIG. 4 depicts a typical cell in the LMDS of FIG. 3.

Referring to FIG. 3, there is depicted a multi-cell LMDS, with base stations located in the x-y plane at positions in the grid, given by the following equation: x=0, 1, 2, 3, ... y=0, 1, 2, 3, ... and terminal stations located anywhere in the x-y plane. Each cell is divided into four sectors and given alternating polarization. Within a given cell, polarization can be used to assist in frequency planning. Firstly, the downlink (from BTS to TS) and uplink (TS to BTS) signals can have the same polarization (both horizontal or both vertical, co-polarized) or they can be orthogonally polarized (down -H and up -V or down -V and up -H, cross -polarized). Additionally, sectors within a cell can be co-polarized or cross-polarized. Using the cross-polarized solution decreases the isolation requirements between: (a) the uplink and downlink; and (b) adjacent sectors. For the purposes of describing the method of the present invention, the cross polarized solution is assumed to be used. However, the method of the present invention is equally valid for the co-polarized solution. Because the sectors of a cell use alternating polarization, each BTS must have an even number of sectors. For the purposes of describing the present invention a four sector configuration as shown in FIG. 3 is assumed, with the four sectors oriented as shown in FIG. 4. However, the method of the present invention is also suitable for configurations with a larger number of sectors (e.g. 6, 8, 12, etc.). In effect, the use of alternate polarization in adjacent sectors means that if information of one type is broadcast into a sector on an assigned frequency, it will not inadvertently be picked by a TS in an adjacent sector because the TS antenna allows cross polarization discrimination in the range of 25 db and up.

Assuming clear sky conditions, no blockages and perfect alignment between the receiving antenna, antenna transmitting the wanted signal and the antenna transmitting the interfering signal, the following relations apply:

$$C=P_c-(92.4+20\ \log_{10}F+20\log_{10}D_c)$$

$$I=P_1-(92.4+20\ \log_{10}F+20\ \log_{10}D_1)$$

where: C=received wanted signal (dbm)

$P_T$=transmitted power of the wanted signal (dbm)

$D_c$=distance to the antenna transmitting wanted signal (km)

I=received interfering signal (dbm)

$P_1$=transmitted power of the interfering signal $D_1$=distance to the antenna transmitting interfering signal (km)

F=operating frequency (GHz)

If all the transmitters in the network are using the same power, then $P_1=P_T$ then $$(C/I)_{db}=20\ \log_{10}(D_1/D_c)$$

The above formula is used to determine the minimum frequency reuse distance. Given a BTS to TS radio link in a first cell utilizing a specified frequency channel, the minimum frequency reuse distance is the minimum distance at which the same frequency channel can be reused for a BTS to TS link in a second cell and the interference caused by the second radio link maintained below a desired C/I level. The reuse distance is measured along a line drawn co-linear with a specified TS to BTS link. Assuming the maximum cell range is R (i.e. the radius of a cell), $$D_1 = R \times 10^{[(C/I)/20]} \qquad (5)$$

If the maximum cell range R is equal to half the distance between two adjacent base stations, than a frequency channel used at one base station shall be reused no closer than K cells away, where, $$K = \text{Ceiling } [(D_1 - R)/2R]$$

In order to control the frequency assignments up to the required distance (K number of cells), the base stations in the network are arranged in groups or clusters. Each cluster is basically a square area containing $K^2$ BTSs (and associated TSs). Once the configuration and frequency assignments for one cluster are completely defined, the network configuration for a theoretical network of infinite size can be generated by repeating or "tilling" the original cluster along directions parallel with the axes of the xy plane. After defining the frequency/polarization configuration of the first cluster, the configuration of the entire network can then be defined with the frequency assignments managed in such a way that they can be repeated seamlessly across the surrounding clusters as many times as required.

Consider a network composed of m columns with n rows of base stations. For convenience, the base stations are referred to as $B_{i,j}$, where i=0, 1, 2, ... m and j=0, 1, 2, ... n. Individual sectors are referred to as $B_{i,j,s}$ where s=0, 1, 2 ... S−1 and S is the number of sectors per base station.

In FIG. 2 it can be seen that, if all cells use the same frequency channel, a number of zones with high levels of interference would exist within each sector. The areas with interference extend radially from the base station, with the interference level growing stronger as the distance to the serving base station increases. The number of relevant interference zones depends on: (1) the C/I threshold considered acceptable; and (2) the directivity of the base station sector antennas. The angular width or "thickness" of the interference zones depends on the directivity of the terminal station antennae.

The interference zones within one sector are referred to as $B_{i,j,s,z}$ where z=0, 1, 2 ... Z−1 and Z is the total number of interference zones within a cell. Problematic interference zones appear where distant BTSs are co-linear with a TS and its serving BTS. The interfering signal from the distant BTS cannot be excluded by the directional antenna of the TS. To eliminate these problematic interference zones, the frequency reuse plan integral to the present invention is used. The frequency channel or channels assigned to the terminal stations within an interference area are not be used at any possible interfering distant BTS. Additionally, TSs which are located outside the problematic interference zones (i.e. the "neutral" zones) are assigned any of the frequencies determined to be acceptable for use within that sector.

The total available frequency spectrum (i.e. the total number of radio channels) is divided into a number C groups of subsets of frequency channels. From the total number of frequency groups, $K^2$ groups are used for frequency assignments within the interference areas, as well as the rest of the network area. Obviously C must be greater than or equal with $K^2$. The rest of the groups $C - K^2$ are assigned only to links outside the interference zones. The frequency groups are referred to as $f_k$, where k=0, 1, ... $K^2$, ... C−1. A set of frequency groups are assigned to each sector $B_{i,j,s}$. The set of frequency groups assigned to $B_{i,j,s}$ are referred to as $F_{i,j,s} = \{f_k, f_l, f_m /\text{where } k, l, m, \ldots \text{ could take any value 0 to C−1}\}$ $F_{i,j,s}$ can contain only one or more frequency groups.

A set containing only one frequency group is assigned to each interference zone $B_{i,j,s,z}$. The set of frequency groups assigned to $B_{i,j,s,z}$ is referred to as $F_{i,j,s,z}$, $\{f_k /\text{where k could take any value 0 to } K^2 - 1\}$ Method of the Present Invention The method of the present invention dictates that the frequency group assignments must respect the following restrictions:

(1) any frequency group assigned to an interference zone must also belong to the respective sector i.e.

$$F_{i,j,s,z} \subseteq F_{i,j,s} \text{ for all i, j, s, z} \qquad (1)$$

(2) any frequency group assigned to an interference zone must not be assigned to the sector or the sectors creating the interference zone (see FIG. 4).

Only interference zones created by sectors less than K cells away need to be considered (since in theory, for a desired C/I cells further away are non-interfering). For example, assuming K=4 and a four sector configuration like in FIG. 5, there are nine interference zones generated at angles 270°, 288.4°, 306.6°, 313.7°, 315°, 326.3°, 333.4°, 341.6°, 360°, trigonometrically referenced to the X axis.

The frequency which can be assigned to all the interference zones created by the $B_{i,j}$ cell is generally given as:

$$f_{(i \bmod K) + 4(j \bmod K)} \notin F_{i,j,s} \text{ for an i, j, s}$$

For K=4

$$f_{(i \bmod 4) + 4(j \bmod 4)} \notin F_{i,j,s} \text{ for an i, j, s} \qquad (2)$$

In other words, for the $B_{i,j}$ cell, equation (2) determines the frequency which cannot be used in that cell, but which is available to be assigned to the interference zones which are produced by that cell.

If the interference zones from multiple different co-linear cells overlap, the frequency group corresponding to the closest interfering cell is assigned to the common interference zone. Additional frequency groups have to be reserved or "forbidden" at the other sectors affected.

Figure 5:
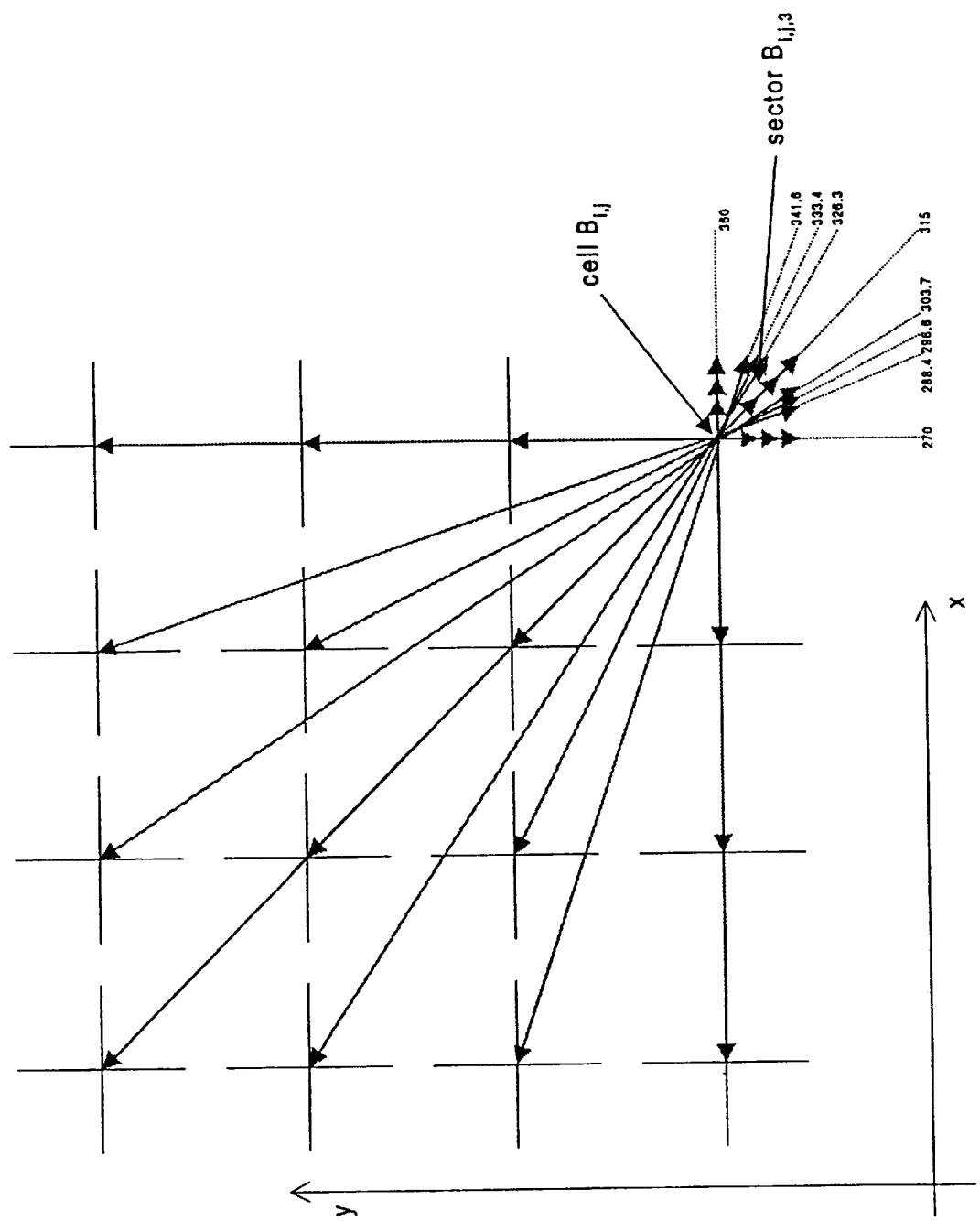
FIG. 5 is a plot of the interference zones arising in a cell sector within an LMDS.

Referring to FIG. 5, the nine interference zones $B_{i,j,3,0}$ to $B_{i,j,3,8}$ will be assigned frequencies as follows:

$$F_{i,j,3,0} = \{f_{(i \bmod 4) + 4(j+1) \bmod 4}\}$$

$$F_{i,j,3,1} = \{f_{(i-1) \bmod 4 + 4(j+3) \bmod 4}\}$$

$$F_{i,j,3,2} = \{f_{(i-1) \bmod 4 + 4(j+2) \bmod 4}\}$$

$$F_{i,j,3,3} = \{f_{(i-2) \bmod 4 + 4((j+3) \bmod 4)}\}$$

$$F_{i,j,3,4} = \{f_{(i-1) \bmod 4 + 4((j+1) \bmod 4)}\}$$

$$F_{i,j,3,5} = \{f_{(i-3) \bmod 4 + 4((j+2) \bmod 4)}\}$$

$$F_{i,j,3,6} = \{f_{(i-2) \bmod 4 + 4((j+1) \bmod 4)}\}$$

$$F_{i,j,3,7} = \{f_{(i-3) \bmod 4 + 4((j+1) \bmod 4)}\}$$

$$F_{i,j,3,8} = \{f_{(i-1) \bmod 4 + 4((j+4) \bmod 4)}\} \qquad (3)$$

As mentioned earlier, some cells must "drop" additional channels to resolve conflicts related to overlapping interference zones (i.e. more than one BTS within a cluster causes sector interference in a specified zone):

(a) Zone $B_{i,j,3,0}$:
The frequency group $f_{i \bmod 4+4((j+1) \bmod 4)}$ cannot be used at the sectors $B_{i,j+2,s}$ and $B_{i,j+3,s}$ for s=2 and 3. Since this is valid for an i, j, it can be expressed as:

$$f_{i \bmod 4+4((j-1) \bmod 4)} \{F_{i,j,s} \quad \text{for an } i, j \text{ and } s=2, 3$$
$$f_{i \bmod 4+4((j-2) \bmod 4)} \{F_{i,j,s} \quad \text{for an } i, j \text{ and } s=2, 3 \quad (4)$$

(b) The same is valid for the zone $B_{i,j,3,4}$:

$$F_{(i+2) \bmod 4+4(j-2) \bmod 4} \{F_{i,j,s}, \text{ for an } i, j \text{ and } s=3$$
$$F_{(i+1) \bmod 4+4(j-1) \bmod 4} \{F_{i,j,s}, \text{ for an } i, j \text{ and } s=3$$

(c) And also for the zone $B_{i,j,3,8}$:

$$F_{(i+2) \bmod 4+4(j \bmod 4)} \{F_{i,j,s}, \text{ for an } i, j \text{ and } s=1, 3$$
$$F_{(i+2) \bmod 4+4(j \bmod 4)} \{F_{i,j,s}, \text{ for an } i, j \text{ and } s=1, 3$$

Totally, for the sector $B_{i,j,3}$ in FIG. 5, from the total $K^2=16$ reserved frequency groups, 9 groups are assigned for interference zones according to relations (2), and 7 groups are "forbidden" according to relations (2) and (4). The rest of available frequency groups, up to the total C, can be used anywhere else inside the $B_{i,j,3}$ (i.e. in the neutral zones).

No assumptions have been made regarding the polarization structure. In practical applications, some specific polarization assignments may offer sufficient signal isolation so that some of the nine interference zones shown in FIG. 5 are not generated. This will serve to free some frequency groups previously reserved for specific interference zones for use anywhere within the sector.

In the same manner the frequency assignments for the other sectors 0, 1 and 2 are determined as described in relations (4) through (9):

$$F_{i,j,0,0} = \{f_{(i-1) \bmod 4+4(j \bmod 4)}\}$$
$$F_{i,j,0,1} = \{f_{(i-3) \bmod 4+4((j-1) \bmod 4)}\}$$
$$F_{i,j,0,2} = \{f_{(i-2) \bmod 4+4((j-1) \bmod 4)}\}$$
$$F_{i,j,0,3} = \{f_{(i-3) \bmod 4+4(j-2) \bmod 4}\}$$
$$F_{i,j,0,4} = \{f_{(i-1) \bmod 4+4(j-1) \bmod 4}\}$$
$$F_{i,j,0,5} = \{f_{(i-2) \bmod 4+4(j-3) \bmod 4}\}$$
$$F_{i,j,0,6} = \{f_{(i-1) \bmod 4+4(j-2) \bmod 4}\}$$
$$F_{i,j,0,7} = \{f_{(i-1) \bmod 4+4(j-3) \bmod 4}\}$$
$$F_{i,j,0,8} = \{f_{i \bmod 4+4((j-1) \bmod 4)}\} \quad (5)$$
$$f_{(i+1) \bmod 4+4(j \bmod 4)} \{F_{i,j,s} \quad \text{for an } i,j \text{ and } s=0,3$$
$$f_{(i+2) \bmod 4+4(j \bmod 4)} \{F_{i,j,s} \quad \text{for an } i,j \text{ and } s=0,3$$
$$f_{(i+2) \bmod 4+4((j-2) \bmod 4)} \{F_{i,j,s} \quad \text{for an } i,j \text{ and } s=0$$
$$f_{(i+1) \bmod 4+4((j-1) \bmod 4)} \{F_{i,j,s} \quad \text{for an } i,j \text{ and } s=0$$
$$f_{i \bmod 4+4((j+2) \bmod 4)} \{F_{i,j,s} \quad \text{for an } i,j \text{ and } s=0,1$$
$$f_{i \bmod 4+4((j+1) \bmod 4)} \{F_{i,j,s} \quad \text{for an } i,j \text{ and } s=0,1 \quad (6)$$

$$F_{i,j,1,0} = \{f_{i \bmod 4+4((j-1) \bmod 4)}\}$$
$$F_{i,j,1,1} = \{f_{(i+1) \bmod 4+4((j-3) \bmod 4)}\}$$
$$F_{i,j,1,2} = \{f_{(i+1) \bmod 4+4((j-2) \bmod 4)}\}$$
$$F_{i,j,1,3} = \{f_{(i+2) \bmod 4+4((j-3) \bmod 4)}\}$$
$$F_{i,j,1,4} = \{f_{(i+1) \bmod 4+4((j-1) \bmod 4)}\}$$
$$F_{i,j,1,5} = \{f_{(i+3) \bmod 4+4((j-2) \bmod 4)}\}$$
$$F_{i,j,1,6} = \{f_{(i+2) \bmod 4+4((j-1) \bmod 4)}\}$$
$$F_{i,j,1,7} = \{f_{(i+3) \bmod 4+4((j-1) \bmod 4)}\}$$
$$F_{i,j,1,8} = \{f_{(i+1) \bmod 4+4(j \bmod 4)}\} \quad (7)$$
$$f_{i \bmod 4+4(j+1) \bmod 4} \{F_{i,j,s} \quad \text{for an } i,j \text{ and } s=0,1$$
$$f_{i \bmod 4+4(j+2) \bmod 4} \{F_{i,j,s} \quad \text{for an } i,j \text{ and } s=0,1$$
$$f_{(i-2) \bmod 4+4((j+2) \bmod 4)} \{F_{i,j,s} \quad \text{for an } i,j \text{ and } s=1$$
$$f_{(i-1) \bmod 4+4((j+1) \bmod 4)} \{F_{i,j,s} \quad \text{for an } i,j \text{ and } s=1$$
$$f_{(i-1) \bmod 4+4(j \bmod 4)} \{F_{i,j,s} \quad \text{for an } i,j \text{ and } s=1,2$$
$$f_{(i-2) \bmod 4+4(j \bmod 4)} \{F_{i,j,s} \quad \text{for an } i,j \text{ and } s=1,2 \quad (8)$$

$$F_{i,j,2,0} = \{f_{(i+1) \bmod 4+4(j \bmod 4)}\}$$
$$F_{i,j,2,1} = \{f_{(i+3) \bmod 4+4((j+1) \bmod 4)}\}$$
$$F_{i,j,2,2} = \{f_{(i+2) \bmod 4+4((j+1) \bmod 4)}\}$$
$$F_{i,j,2,3} = \{f_{(i+3) \bmod 4+4((j+2) \bmod 4)}\}$$
$$F_{i,j,2,4} = \{f_{(i+1) \bmod 4+4((j+1) \bmod 4)}\}$$
$$F_{i,j,2,5} = \{f_{(i+2) \bmod 4+4((j+3) \bmod 4)}\}$$
$$F_{i,j,2,6} = \{f_{(i+1) \bmod 4+4((j+2) \bmod 4)}\}$$
$$F_{i,j,2,7} = \{f_{(i+1) \bmod 4+4((j+3) \bmod 4)}\}$$
$$F_{i,j,2,8} = \{f_{i \bmod 4+4((j+1) \bmod 4)}\} \quad (9)$$
$$f_{(i-2) \bmod 4+4(j \bmod 4)} \{F_{i,j,s} \quad \text{for an } i,j \text{ and } s=1,2$$
$$f_{(i-1) \bmod 4+4(j \bmod 4)} \{F_{i,j,s} \quad \text{for an } i,j \text{ and } s=1,2$$
$$f_{(i-2) \bmod 4+4((j-2) \bmod 4)} \{F_{i,j,s} \quad \text{for an } i,j \text{ and } s=2$$
$$f_{(i-1) \bmod 4+4((j-1) \bmod 4)} \{F_{i,j,s} \quad \text{for an } i,j \text{ and } s=2$$
$$f_{i \bmod 4+4((j-1) \bmod 4)} \{F_{i,j,s} \quad \text{for an } i,j \text{ and } s=2,3$$
$$f_{(i \bmod 4+4((j-1) \bmod 4)} \{F_{i,j,s} \quad \text{for an } i,j \text{ and } s=2,3 \quad (10)$$

The relations (9) to (17) completely characterize the frequency plan for a network with any number of base stations.

It is to be noted that the relations (10) to (17) have been determined based on K=4 and the 4 sector structure in FIG. 5. If the frequency reuse distance parameter K is smaller or larger, then there will be fewer (or more) interference zones. The formulas (10) to (17) will still apply in the same way, to a reduced or extended set of interference areas. Also, if the number of sectors is different than 4 (for example 8 per base station), the formulas (10) to (17) are still valid. To generalize, the expression (9) can be written for any K:

$$f_{(i \bmod K)+K(j \bmod K)} \{F_{i,j,s} \quad \text{for an } i, j, s \quad (11)$$

The formulas (10) to (17) could be generalized for any value of the reuse distance parameter K, as follows:

$$F_{i,j,s,z} = \{f_{(i+a) \bmod K+K((j+b) \bmod K)}\}, \text{ for } a, b \text{ integer and } *a^*, *b^* < K,$$
$$\text{for an } i, j, \text{ any } s=1, 2, \ldots, S-1, z=1, 2, \ldots Z-1 \quad (12)$$
$$f_{(i+a) \bmod K+K((j+b) \bmod K)} \{F_{i,j,s}, \text{ for an } i, j, s=1, 2, \ldots, S-1a, b$$
$$\text{integer and } *a^*, *b^* < K-1$$

a>0 for s=0, 3  a<0 for s=1, 2
b>0 for s=0, 1  b<0 for s=2, 3

Figure 6:
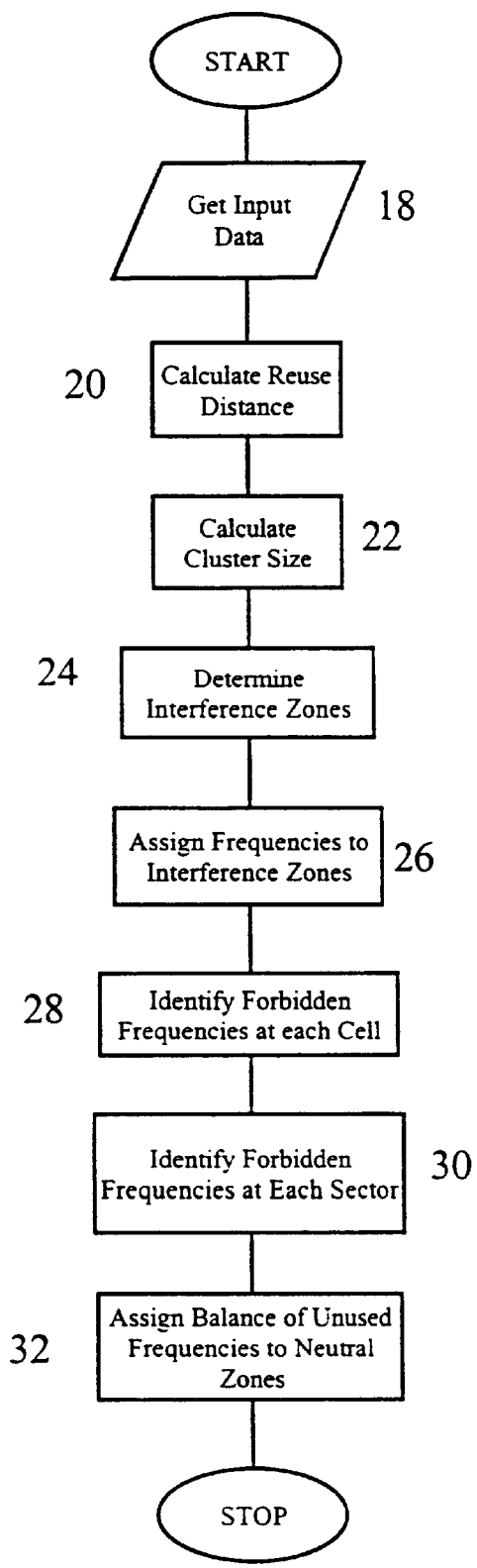
FIG. 6 is a flow chart depicting the method of the present invention.

FIG. 6 depicts a flow chart describing generally the method of the present invention. At step 18, the necessary data to determine the frequency reuse plan is obtained. This includes: (a) the required C/I; (b) the network layout (i.e. m×n base stations); and (c) the frequencies which are available to be assigned. At step 20, the reuse distance is calculated using the formula:

$$D_1 = R \times 10^{[(C/I)/20]}$$

Having calculated the required reuse distance, at step 22, the required cluster size is then determined using the formula:

$$K = \text{Ceiling } [(D_1-R)/2R] \qquad 5$$

At step 24, the interference zones are determined given the cluster size e.g. where K=4, there would be 9 interference zones (0 to 8), where K=3, there would be 5 interference zones, etc. The assignment of frequency channels to interference zones is then performed at step 26 using the formula:

$$F_{i,j,s,z} = \{f_{(i+a) \bmod K+K((j+b) \bmod K)}\}, \text{ for } a, b \text{ integer and } *a*, *b* < K,$$
$$\text{for an } i, j, \text{ any } s=1, 2, \ldots, S-1, z=1, 2, \ldots, Z-1$$

At step 28, the "forbidden" frequency channels are identified for each cell using the formula:

$$f_{(i \bmod K)+K(j \bmod K)} \in F_{i,j,s},$$

At step 30, the "forbidden" frequency channels at each sector are identified using the formula:

$$f_{(i+a) \bmod K+K((j+b) \bmod K)} \in F_{i,j,s}, \text{ for an } i, j, s=1, 2, \ldots, S-1 a, b \text{ integer and } *a*, *b| < K-1$$

a>0 for s=0, 3 a<0 for s=1, 2
b>0 for s=0, 1 b<0 for s=2, 3

Finally, at step 32, the balance of unused frequencies are assigned within the "neutral" zones of a particular sector. It is important to note that if there are insufficient frequencies available or if the there is simply a decision not to assign available frequencies to the neutral zones, then a TS in a neutral zone can simply be programmed to receive on the frequency assigned to the adjacent interference zone.

EXAMPLE 1

Frequency Reuse Scheme for 16.9 dB

In this example, the method of the present invention described above is applied to a network with 6×6 base stations (i.e. i=0–5 and j=0–5). The target C/I level is assumed 16.9 db. The network sectorization and polarization structure is assumed to be the one shown in FIG. 4. Also, the available frequency spectrum is assumed to be channelized into 17 available radio frequency groups, 0 to 16.

1. Calculate the minimum frequency reuse distance:

$$D_1 = R \times 10^{(16.9/20)} = 6.99R$$

2. Calculate the required cluster size:

$$K = \text{Ceiling } [(6.99R-R)/2R] = 3$$

The cluster therefore includes 3×3=9 base stations. Accordingly, from the total of 17 frequency groups, 9 frequency groups, 0 to 8, are reserved for frequency assignments to interference zones. The frequency groups 9 to 16 will be used for frequency assignments of the radio links in the neutral zones.

3. Determine the number of interference zones assign frequency channels to interference zones. For K=3, five interference zones are generated within each sector. Frequency assignment is determined using $F_{i,j,s,z} = \{f_{(i+a) \bmod K+K((j+b) \bmod K)}\}$, where above i, j, can take values between 0 and 5, s can take the values 0 to 3, z can take the values 0 to 4, and a, b is integer with *a*, *b*<K, for an i, j:

For all sectors 0:

$$F_{i,j,0,0} = \{f_{(i-1) \bmod 3 + 3(j \bmod 3)}\}$$
$$F_{i,j,0,1} = \{f_{(i-2) \bmod 3 + 3((j-1) \bmod 3)}\}$$
$$F_{i,j,0,2} = \{f_{(i-1) \bmod 3 + 3((j-1) \bmod 3)}\}$$
$$F_{i,j,0,3} = \{f_{(i-1) \bmod 3 + 3((j-2) \bmod 3)}\}$$
$$F_{i,j,0,4} = \{f_{i \bmod 3 + 3((j-1) \bmod 3)}\}$$

For all sectors 1:

$$F_{i,j,1,0} = \{f_{i \bmod 3 + 3((j-1) \bmod 3)}\}$$
$$F_{i,j,1,1} = \{f_{(i-1) \bmod 3 + 3((j-2) \bmod 3)}\}$$
$$F_{i,j,1,2} = \{f_{(i-1) \bmod 3 + 3((j-1) \bmod 3)}\}$$
$$F_{i,j,1,3} = \{f_{(i-2) \bmod 3 + 3((j-1) \bmod 3)}\}$$
$$F_{i,j,1,4} = \{f_{(i-1) \bmod 3 + 3(j \bmod 3)}\}$$

For all sectors 2:

$$F_{i,j,2,0} = \{f_{(i-1) \bmod 3 + 3(j \bmod 3)}\}$$
$$F_{i,j,2,1} = \{f_{(i-2) \bmod 3 + 3((j-1) \bmod 3)}\}$$
$$F_{i,j,2,2} = \{f_{(i-1) \bmod 3 + 3((j-1) \bmod 3)}\}$$
$$F_{i,j,2,3} = \{f_{(i-1) \bmod 3 + 3((j-2) \bmod 3)}\}$$
$$F_{i,j,2,4} = \{f_{i \bmod 3 + 3((j-1) \bmod 3)}\}$$

For all sectors 3:

$$F_{i,j,3,0} = \{f_{i \bmod 3 + 3((j-1) \bmod 3)}\}$$
$$F_{i,j,3,1} = \{f_{(i-2) \bmod 3 + 3((j-2) \bmod 3)}\}$$
$$F_{i,j,3,2} = \{f_{(i-1) \bmod 3 + 3((j-1) \bmod 3)}\}$$
$$F_{i,j,3,3} = \{f_{(i-1) \bmod 3 + 3((j-1) \bmod 3)}\}$$
$$F_{i,j,3,4} = \{f_{(i-1) \bmod 3 + 3(j \bmod 3)}\}$$

Figure 9:
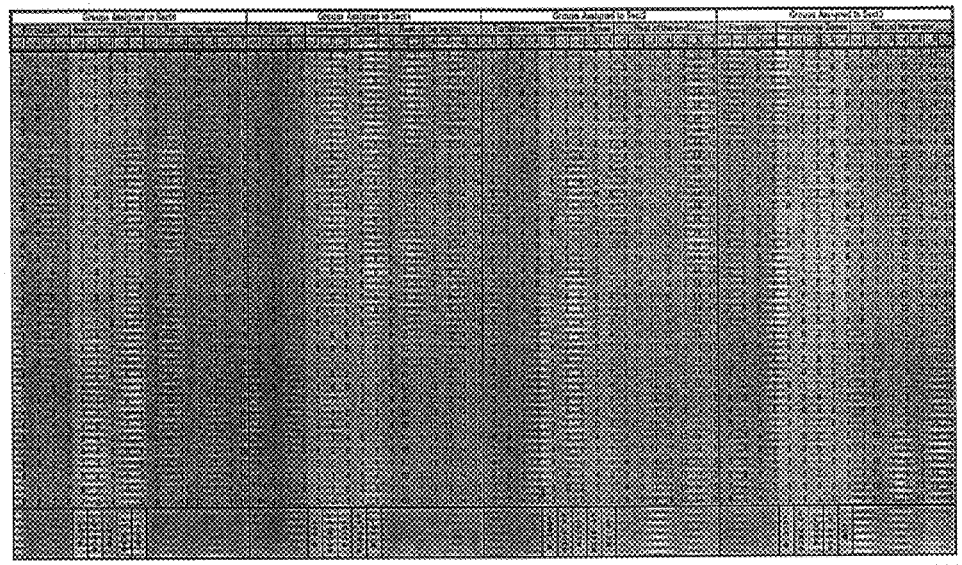
FIG. 9 details the frequency assignments for a simulated network, using the method of the present invention.

The results are listed in FIG. 9 in the "interference Zones" column.

4. Identify the "Forbidden" frequency channels at each cell and at each sector. To determine the frequency channels which are not available at each cell use:

$$f_{(i \bmod 3)+3(j \bmod 3)} \in F_{i,j,s} \text{ for an } i, j,=1, 2, \ldots, 6 \text{ and } s=0, 1, 2, 3$$

To determine the frequency channels which are not available in a specified sector use:

$$f_{(i+1) \bmod 3 + 3(j \bmod 3)} \in F_{i,j,s} \text{ for an } i,j \text{ and } s=0,3$$
$$f_{(i+1) \bmod 3 + 3((j+1) \bmod 3)} \in F_{i,j,s} \text{ for an } i,j \text{ and } s=0$$
$$f_{i \bmod 3 + 3((j+1) \bmod 3)} \in F_{i,j,s} \text{ for an } i,j \text{ and } s=0,1$$
$$f_{(i+1) \bmod 3 + 3((j+1) \bmod 3)} \in F_{i,j,s} \text{ for an } i,j \text{ and } s=1$$
$$f_{(i+1) \bmod 3 + 3(j \bmod 3)} \in F_{i,j,s} \text{ for an } i,j \text{ and } s=1,2$$
$$f_{(i+1) \bmod 3 + 3((j+1) \bmod 3)} \in F_{i,j,s} \text{ for an } i,j \text{ and } s=2$$
$$f_{i \bmod 3 + 3((j+1) \bmod 3)} \in F_{i,j,s} \text{ for an } i,j \text{ and } s=2,3$$
$$f_{(i+1) \bmod 3 + 3((j+1) \bmod 3)} \in F_{i,j,s} \text{ for an } i,j \text{ and } s=3$$

The results are listed in FIG. 9 in the "Forbidden" column.

Figure 7:
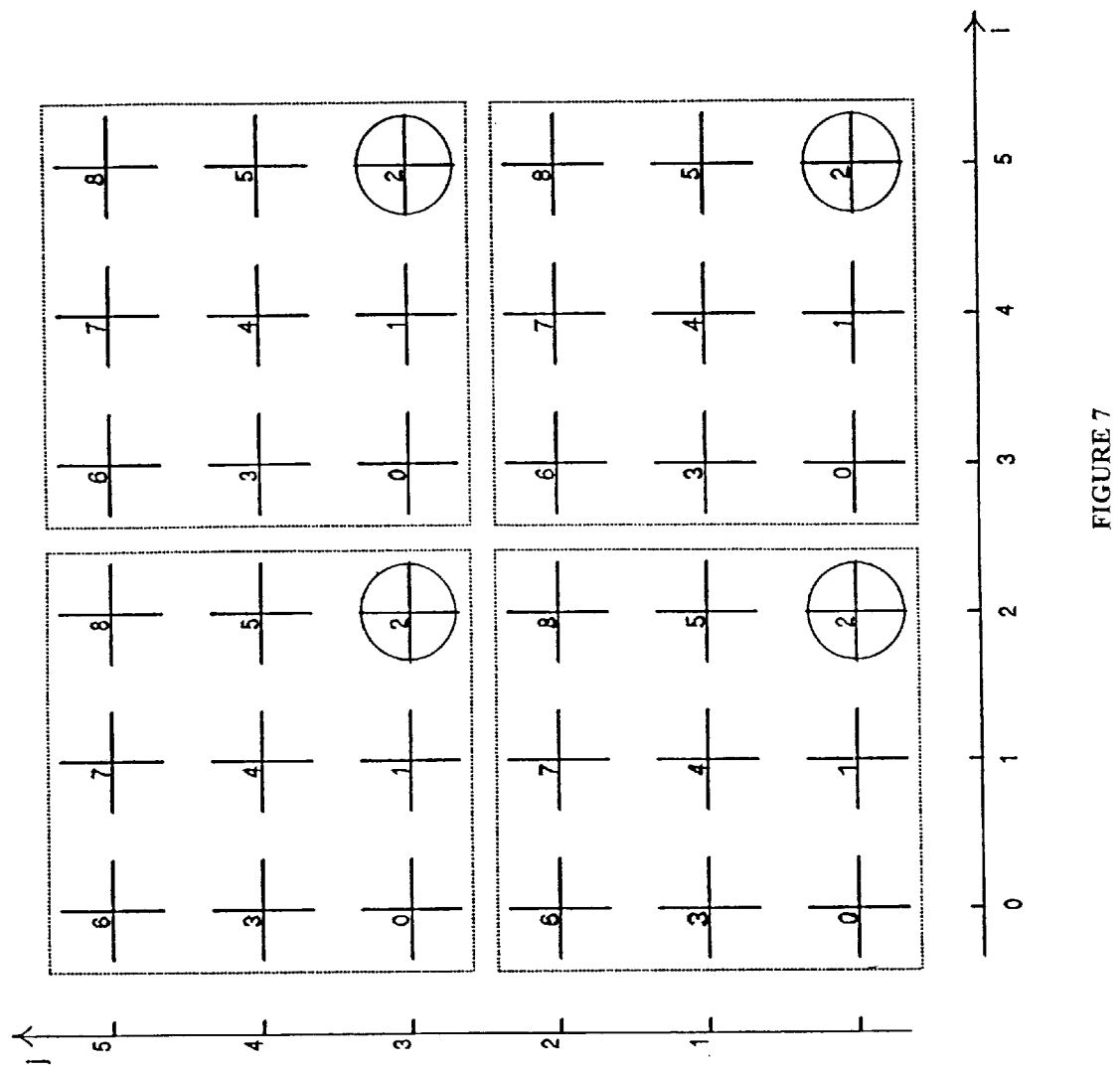
FIG. 7 is a graphical representation of the cluster and frequency assignments contained in Table 1.

The "Type" column in Table 1 indicates the position of the base station relative to the cluster to which it belongs. The cluster configuration and cell type of Table 1 are graphically depicted in FIG. 7. It can be seen that base stations located in the same position in adjoining clusters (e.g. $B_{2,0}$, $B_{5,0}$, $B_{5,3}$, and $B_{2,3}$) receive identical frequency assignments.

Figure 8:
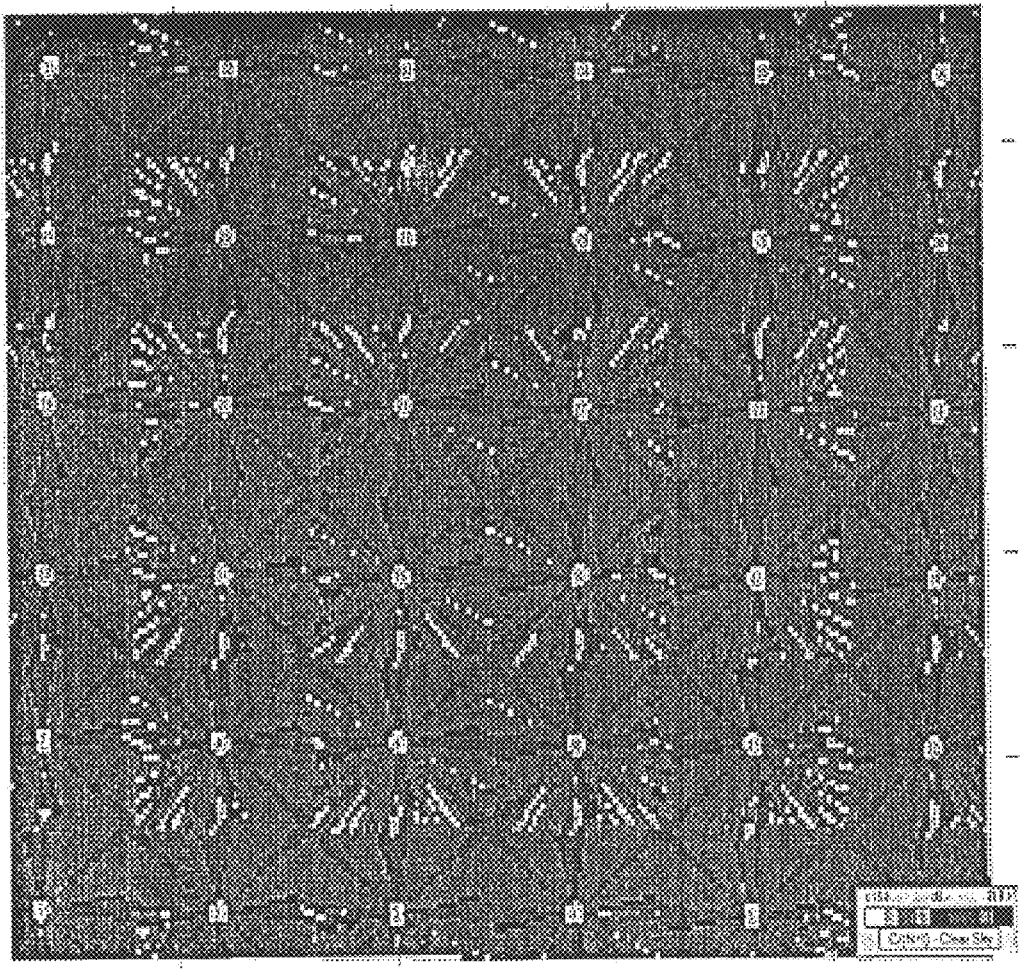
FIG. 8 depicts the results of an RF simulation using the frequency assignments of FIG. 9.

Using the results of Table 1 a simulation was conducted and the results are depicted in FIG. 8. It can be seen that the minimum C/I achieved in any point of the service area is higher than 16.9 db. There are still a few points where the C/I level is below 16.9 db. This is a simulation issue, the problem being created by the inability of the simulation tool to control the exact angles where specific frequency channels are assigned. In this case, the interference zones at 26.40 from the edge of the sector are not fully covered with the correct frequencies.

The advantages of the present invention are now readily apparent:

(a) the method of the present invention is specifically designed for Local Multi-point Distribution Systems, exploiting the directivity of the directional terminal and Base station antennae;

(b) the method ensures uniform traffic capacity in all areas of the network;

(c) the method is scalable, being applicable for networks of any size, with any number of base stations; and (d) the method can be used to generate frequency reuse schemes which provide the highest capacity for a desired C/I ratio.

A person skilled in the art may now conceive of alternate structures and embodiments or variations of the above. All those which fall within the scope of the claims appended hereto are considered to be part of the present invention.

The embodiments of the invention in which an exclusive property or privilege is claimed are defined as follows:

1. In a fixed wireless network utilizing an assigned group of frequency channels and comprising i×j cells, wherein each of said cells is divided into an even number of at least four sectors, and wherein each of said cells includes a base station and a plurality of terminal stations, a method of frequency reuse comprising the steps of:

(a) receiving input data including; (i) a desired carrier to interference ratio; (ii) the number of said cells in said network; and (iii) the number of said frequency channels available;

(b) calculating a reuse distance based on said desired carrier to interference ratio;

(c) calculating a cluster size based on said calculated reuse distance;

(d) determining the position and number of interference zones within each of said sectors, wherein said interference zones are a function of said cluster size;

(e) assigning frequency channels to said interference zones;

(f) determining which of said allotted frequency channels cannot be used within a specified one of said cells;

(g) determining which of said allotted frequency channels cannot be used within a specified one of said sectors; and (h) assigning any remaining ones of said allotted frequency channels to one or more neutral zones extending between said interference zones.

2. The method of claim 1 wherein said fixed wireless network is a local multi-point distribution system.

3. The method of claim 1 wherein said fixed wireless network operates in the frequency range of 24.0 GHz to 42.0 Ghz.

4. The method of claim 1 wherein each of said cells is cross-polarized.

5. The method of claim 1 wherein each of said cells is co-polarized.

6. The method of claim 1 wherein step (b) is calculated using the formula:

$$D_1 = R \times 10^{[(C/I)/20]}$$

wherein, $D_1$ is the distance from the base station of a first one of said cells transmitting an interfering signal to a base station of a second one of said cells transmitting a carrier signal;

R is the maximum range of each of said cells; and

C/I is said carrier to interference ratio.

7. The method of claim 1 wherein step (c) is calculated using the formula:

$$K = \text{Ceiling}\,[(D_1-R)/2R]$$

wherein,

K is the square root of said cluster size;

$D_1$ is the distance from the base station of a first one of said calls transmitting an interfering signal to a base station of a second one of said cells transmitting a carrier signal; and R is the maximum range of one of said cells.

8. The method of claim 1 wherein the step (e) is calculated using the formula:

$$F_{i,j,s,z} = \{f_{(i+a)\,mod\,K + K([(]j+b)mod\,K)}\}$$

wherein, $F_{i,j,s,z}$ is the frequency channel to be allotted, wherein, i,j is the specified one of said cells, s is the specified one of said sections, with s=1, 2, ... , S−1, z is the specified one of said interference zones with z=1, 2, ... Z−1;

K is the square root of said cluster size; and a and b are integers with *a*, *b*<K, for cell i,j.

9. The method of claim 1 wherein step (f) is determined using the formula:

$$f_{(i\,mod\,K)+K(j\,mod\,K)pullout;zu519400.001Fi,j,s},$$

wherein, i,j is the specified one of said cells;

s is the specified one of said sectors, with s 1, 2, ... , S−1; and

K is the square root of said cluster size.

10. The method of claim 1 wherein step (g) is determined using the formula:

$$f_{(i+a)\,mod\,K+K((j+b)\,mod\,K}\mathfrak{f}F_{i,j,s},$$

wherein, i, j is a specified one of said cells;

s is a specified one of said sectors, with s=1, 2, ... , S−1; and a and b are integers with *a*, *b*|<K−1, with a>0 for s=0, 3 a<0 for s 1, 2 b>0 for s=0, 1 and b<0 for s=2, 3.

11. A system for facilitating data transfer comprising:

a backbone network;

a fixed wireless network utilizing an assigned group of frequency channels and comprising i×j cells, wherein each of said cells is divided into an even number of at least four sectors, and wherein each of said cells includes a base station in radio frequency contact with a plurality of terminal stations located in said cell, said base station also communicating with said backbone network; and means for maximizing the data traffic which can be processed through said fixed wireless network;

wherein said maximizing means carries out at least a method of frequency reuse comprising the steps of:
(a) receiving input data including: (i) a desired carrier to interference ratio; (ii) the number of said cells in said network; and (iii) the number of said frequency channels available;
(b) calculating a reuse distance based on said desired carrier to interference ratio;
(c) calculating a cluster size based on said calculated reuse distance;
(d) determining the position and number of interference zones within each of said sectors, wherein said interference zones are a function of said cluster size;
(e) assigning frequency channels to said interference zones;
(f) determining which of said allotted frequency channels cannot be used within a specified one of said cells;
(g) determining which of said allotted frequency channels cannot be used within a specified one of said sectors; and
(h) assigning any remaining ones of said allotted frequency channels to one or more neutral zones extending between said interference zones.

12. The system of claim 11 wherein said fixed wireless network is a local multi-point distribution system.

13. The system of claim 11 wherein said fixed wireless network operates in the frequency range of 24.0 GHz to 42.0 Ghz.

14. The system of claim 11 wherein each of said cells is cross-polarized.

15. The system of claim 11 wherein each of said cells is co-polarized.

16. The system of claim 11 wherein step (b) is calculated using the formula:

$$D_1 = R \times 10^{[(C/I)/20]}$$

wherein, $D_1$ is the distance from the base station of a first one of said cells transmitting an interfering signal to a base station of a second one of said cells transmitting a carrier signal;

R is the maximum range of each of said cells; and

C/I is said carrier to interference ratio.

17. The system of claim 11 wherein step (c) is calculated using the formula:

$$K = \text{Ceiling}\,[(D_1-R)/2R]$$

wherein,

K is the square root of said cluster size;

$D_1$ is the distance from the base station of a first one of said cells transmitting an interfering signal to a base station of a second one of said cells transmitting a carrier signal; and R is the maximum range of one of said cells.

18. The system of claim 11 wherein the step (e) is calculated using the formula:

$$F_{i,j,s,z} = \{f_{(i+a)\bmod K + K(j+b)\bmod K}\}$$

wherein, $F_{i,j,s,z}$ is the frequency channel to be allotted, wherein,
i,j is the specified one of said cells,
s is the specified one of said sections, with s=1, 2, ..., S−1,
z is the specified one of said interference zones with z=1, 2, ... Z−1;

K is the square root of said cluster size; and a and b are integers with *a*, *b*<K, for cell i,j.

19. The system of claim 11 wherein step (f) is determined using the formula:

$$f_{(i\bmod K)+K(j\bmod K)} \{F_{i,j,s,z},$$

wherein, i,j is the specified one of said cells;

s is the specified one of said sectors, with s=1, 2, ..., S−1; and

K is the square root of said cluster size.

20. The system of claim 11 wherein step (g) is determined using the formula:

$$f_{(i+a)\bmod K + K(j+b)\bmod K\,pullout;zu519400.001} F_{i,j,s},$$

wherein, i,j is a specified one of said cells;

s is a specified one of aid sectors, with s=1, 2, ..., S−1; and a and b are integers with *a*, *b*|<K−1, with a>0 for s=0, 3 a<0 for s=1, 2 b>0 for s=0, 1 and b<0 for s=2, 3.

21. A computer readable medium having stored thereon, computer-executable instructions which, when executed by a processor, cause the processor to perform the steps of:
(a) receiving input data including: (i) a desired carrier to interference ratio; (ii) the number of cells i×j in a fixed wireless network; and (iii) the number of frequency channels assigned to said network, wherein each of said cells includes a base station in radio frequency contact with a plurality of terminal stations located in said cell;
(b) calculating a reuse distance based on said desired carrier to interference ratio;
(c) calculating a cluster size based on said calculated reuse distance;
(d) determining the position and number of interference zones within each sectors of said cells, wherein said interference zones are a function of said cluster size, and wherein each of said cells is divided into an even number of at least four sectors;
(e) assigning frequency channels to said interference zones;
(f) determining which of said allotted frequency channels cannot be used within a specified one of said cells;
(g) deetermining which of said allotted frequency channels cannot be used within a specified one of said sectors; and
(h) assigning any remaining ones of said allotted frequency channels to one or more neutral zones extending between said interference zones.

22. The computer readable medium of claim 21 wherein said fixed wireless network is a local multi-point distribution system.

23. The computer readable medium of claim 21 wherein said fixed wireless network operates in the frequency range of 24.0 GHz to 42.0 Ghz.

24. The computer readable medium of claim 21 wherein each of said cells is cross-polarized.

25. The computer readable medium of claim 21 wherein each of said cells is cc-polarized.

26. The computer readable medium of claim 21 wherein step (b) is calculated using the formula:

$$D_1 = R \times 10^{[(C/I)/20]}$$

wherein, $D_1$ is the distance from the base station of a first one of said cells transmitting an interfering signal to a base station of a second one of said cells transmitting a carrier signal;

R is the maximum range of each of said cells; and

C/I is said carrier to interference ratio.

27. The computer readable medium of claim 21 wherein step (c) is calculated using the formula:

$$K = \text{Ceiling } [(D_1 - R)/2R]$$

wherein,

K is the square root of said cluster size;

$D_1$ is the distance from the base station of a first one of said cells transmitting an interfering signal to a base station of a second one of said cells transmitting a carrier signal; and R is the maximum range of one of said cells.

28. The computer readable medium of claim 21 wherein the step (e) is calculated using the formula:

$$F_{i,j,s,z} = \{f_{(i+a) \bmod K + K((j+b) \bmod K)}\}$$

wherein, $F_{i,j,s,z}$ is the frequency channel to be allotted, wherein, i,j is the specified one of said cells, s is the specified one of said sections, with s=1, 2, ..., S−1, z is the specified one of said interference zones with z=1, 2, ..., Z−1;

K is the square root of said cluster size; and a and b are integers with *a*, *b*<K, for cell i,j.

29. The computer readable medium of claim 21 wherein step (f) is determined using the formula:

$$f_{(i \bmod K) + K(j \bmod K)} \{F_{i,j,s},$$

wherein, i,j is the specified one of said cells;

s is the specified one of said sectors, with s=1, 2, ... S−1; and

K is the square root of said cluster size.

30. The computer readable medium of claim 21 wherein step (g) is determined using the formula:

$$F_{(i+a) \bmod K + K((j+b) \bmod K)} \{F_{i,j,s},$$

wherein, i,j is a specified one of said cells;

s is a specified one of said sectors, with s=1, 2, ..., S−1; and a and b are integers with *a*, *b|k<K−1, with a>0 for s=0, 3 a<0 for s=1, 2 b>0 for s=0, 1 and b<0 for s=2, 3.

* * * * *